Aug. 7, 1934.  E. F. GIBBIN  1,969,070

STORAGE BATTERY

Filed May 4, 1932

Inventor
Edward F. Gibbin
By
Attorney

Patented Aug. 7, 1934

1,969,070

UNITED STATES PATENT OFFICE 1,969,070

STORAGE BATTERY

Edward F. Gibbin, Lancaster, N. Y., assignor to Gould Storage Battery Corp., Depew, N. Y., a corporation of Delaware Application May 4, 1932, Serial No. 609,248

4 Claims. (Cl. 136—80)

The invention relates to storage batteries and has for its general object the provision of a battery having novel means for sealing the cover in place.

It is well known that it is necessary, in storage battery construction, to seal the cover so as to prevent the electrolyte from escaping or leaking out under any circumstances, it being customary to provide vents in the filling plugs to permit the escape of gases generated within the battery during its use. Usually sealing is effected simply by means of plastic material of a bituminous nature which frequently embeds or surrounds lugs carried by the bus bars and resting upon the edge of the battery jar, these lugs constituting suspension means for holding the plate assembly within the jar.

It is with the above facts in view that I have devised the present invention which has for an important object the provision of a storage battery and a cover therefor together with novel means for sealing the cover in place without the usual necessity for embedding the plate suspension lugs, the construction being moreover such that these lugs are contained entirely within and consequently concealed and protected by the cover itself.

A more specific object of the invention is to provide a storage battery in which the cover is clamped down and sealed in place by means associated with lugs carried by the bus bars and extending over the edge of the jar, this means clampingly engaging against the exterior of the cover.

A still more specific object of the invention is to provide a storage battery and a cover therefor together with nut members screwed upon posts carried by lugs rising from the bus bars which connect the plates of the positive and negative groups respectively, gasket means being provided for preventing any seepage of electrolyte about the posts.

An additional object is to provide a construction of this character which will be very simple and inexpensive to make and assemble, positive in action, efficient and durable in service, and a general improvement in the art.

Figure 1:
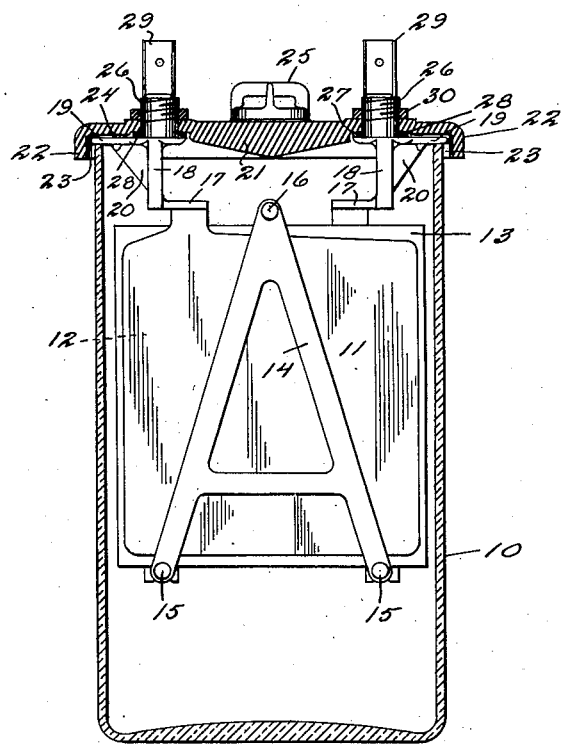
Figure 2:
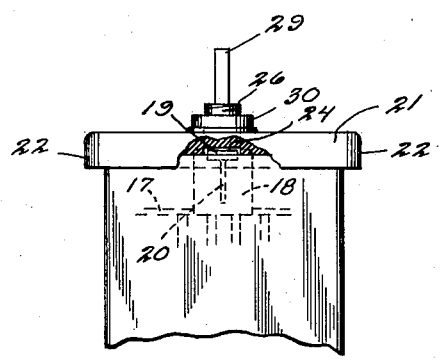

To the attainment of the foregoing and other objects and advantages, the invention preferably consists in the details of construction and the arrangement and combination of parts to be hereinafter more fully described and claimed, and illustrated in the accompanying drawing in which:

Figure 1 is a vertical cross sectional view through a storage battery constructed in accordance with my invention, and Figure 2 is a fragmentary edge view of the upper portion with a part of the cover broken away and in section.

Referring more particularly to the drawing I have shown the battery as comprising a jar or other suitable receptacle 10 formed of any appropriate material such for instance as glass, hard rubber or some conventional composition commonly used for the purpose. This receptacle is disclosed as of rectangular shape in cross section, of uniform dimensions throughout its height and having its upper end or top open. Located within this receptacle are groups of positive and negative plates 11 and 12 spaced apart by the usual separators 13 and held in assembled interleaved relation as by means of frame members 14 disposed against opposite sides of the entire assembly and secured by transverse ties 15 and 16, the former being located beneath the groups of plates and the latter above the upper edges thereof. The separators are shown as extending above and below the upper and lower edges of the plates respectively so as to preclude any short circuiting and moreover the separators preferably project beyond the side edges of the plates to prevent bridging and short circuiting thereof by any growth upon the plates in service. The plates of the respective groups are connected by bus bars 17 from which rise lugs 18 having lateral extensions 19 which extend horizontally and which rest upon the upper edges of the opposite sides of the jar or receptacle 10 as is a common practice. For the sake of stiffening the extensions or projections 19 with respect to the lugs 18, I provide webs 20 joining the outer faces of the lugs 18 with the undersides of the extensions 19.

In accordance with my invention I provide a cover 21 of appropriate insulating material peripherally flanged at 22 and telescopically engaging over the open top of the receptacle. The end flanges 22 are recessed at 23 for the accomodation of the lug extensions 19 and the underside of the cover is likewise recessed at 24 so as to receive these lug extensions while permitting the major portion of the cover to lie flat upon the upper edge of the receptacle. The cover is provided with the usual filling openings normally closed by vented plugs 25, there being nothing unusual in this respect.

In accordance with my invention I provide threaded posts 26 which rise from the respective lugs 18 and which pass through suitable holes in the cover, the underside of which is recessed at 27 for the accommodation of yieldable gaskets 28 of rubber or the like which will operate, when compressed, to prevent any seepage of electrolyte about the posts 26. It will be understood that these posts are formed with reduced extensions 29 which constitute the battery terminals. Securing and sealing of the cover in place is effected by means of nuts 30 which are screwed onto the threaded posts 26 and which operate to clamp the parts so that the groups of plates will be immovable with respect to the cover and consequently with respect to the sides of the jar. However, as the lug extensions 19 rest upon the edges of the jar the weight of the plates does not come upon the cover, this being of importance as the cover, on account of the nature of the material from which it is customarily formed, might not be able to withstand the strain without sagging. After the parts have been assembled as above described it is conceivable that sealing compound might, if desirable or necessary, be placed around the lower edge of the cover or if desired a gasket might be provided at the upper edge of the receptacle, either of these expedients being resorted to for the purpose of preventing any possible leakage of the electrolyte over the edge of the jar.

A battery constructed as shown and described so as to embody the novel characteristics pointed out is of course used in the same manner as any other but has the advantage of having the weight of the plates supported by the edge of the jar while at the same time the cover is actually clamped down into sealing relation to the receptacle and rigidly with respect to the plates so that the latter cannot become displaced in any direction. This construction is advantageous in that the battery will have greater mechanical strength and durability than the ordinary type wherein the cover is not positively clamped in place. It is thought that from the foregoing the construction and benefits obtained thereby will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a storage battery, a receptacle open at the top, groups of interleaved plates and interposed separators located within the receptacle, bus bars connecting the plates of the respective groups, lugs rising from the bus bars and having horizontal extensions overlying the top edges of the receptacle for supporting the weight of the plates, a cover telescoped exteriorly upon the top of the receptacle and extending about and entirely covering and concealing said extensions, threaded posts rising from said lugs and passing through holes in the cover, said posts having reduced extensions constituting the battery terminals, and nuts screwed onto said posts for clamping the cover with respect to said lugs.

2. In a storage battery, a receptacle open at the top, groups of positive and negative plates arranged in insulated interleaved relation and located within the receptacle, bus bars connecting the plates of the respective groups, lugs rising from the bus bars and having horizontal extensions overlying and resting upon the upper edge of the receptacle for supporting the weight of the plates, a cover telescoped exteriorly upon the top of the receptacle in covering relation to said extensions and formed with recesses accommodating the same, threaded posts rising from the horizontal portions of the lugs and extending through the cover and formed with reduced extensions constituting the battery terminals, and nuts screwed upon said posts for clamping the cover with respect to the horizontal portions of the lugs.

3. In a storage battery, a receptacle open at the top, groups of positive and negative plates arranged in insulated interleaved relation and located within the receptacle, bus bars connecting the plates of the respective groups, lugs rising from the bus bars and having horizontal extensions lying upon and projecting beyond the upper edge of the receptacle for supporting the weight of the plates, a cover having a marginal flange telescoped upon the top of the receptacle and formed in its underside and in its flange with recesses accommodating the extensions and the projecting ends thereof, threaded posts rising from the horizontal portions of the lugs and extending through the cover and formed with reduced extensions constituting the battery terminals, and nuts screwed upon said posts for clamping the cover upon the receptacle.

4. In a storage battery, a receptacle open at the top, groups of positive and negative plates arranged in insulated interleaved relation and located within the receptacle, bus bars connecting the plates of the respective groups, lugs rising from the bus bars and having horizontal extensions overlying and resting upon the upper edge of the receptacle for supporting the weight of the plates, webs connecting the outer faces of the lugs with the undersides of the extensions a cover telescoped exteriorly upon the top of the receptacle and formed with recesses accommodating and covering the horizontal extensions of the lugs, threaded posts rising from the horizontal portions of the lugs and extending through the cover and formed with reduced extensions constituting the battery terminals, and nuts screwed upon said posts for clamping the cover upon the receptacle.

EDWARD F. GIBBIN.